United States Patent [19]

Ohta et al.

[11] Patent Number: 5,313,302
[45] Date of Patent: May 17, 1994

[54] APPARATUS FOR SUPERIMPOSING CHARACTER PATTERNS IN ACCORDANCE WITH DOT-MATRIX ON VIDEO SIGNALS

[75] Inventors: Akio Ohta; Michiharu Nishihara, both of Tochigi, Japan

[73] Assignee: Sharp Kabushiki Kaisha, Osaka, Japan

[21] Appl. No.: 531,451

[22] Filed: May 30, 1990

[30] Foreign Application Priority Data

May 30, 1989 [JP] Japan .................. 1-137744

[51] Int. Cl.$^5$ ...................... H04N 5/268; H04N 5/272
[52] U.S. Cl. .................... 348/586; 348/659; 348/705
[58] Field of Search ............ 358/183, 22, 181; H04N 5/262, 5/265, 5/268, 5/272

[56] References Cited

U.S. PATENT DOCUMENTS

| | | | |
|---|---|---|---|
| 4,207,596 | 6/1980 | Pires | 358/22 |
| 4,498,098 | 2/1985 | Stell | 358/22 |
| 4,625,231 | 11/1986 | Vlahos | 358/22 |
| 4,644,401 | 2/1987 | Gaskins | 358/183 |
| 4,796,089 | 1/1989 | Imai et al. | 358/183 |
| 4,971,448 | 11/1990 | Van Zon | 358/183 |

Primary Examiner—Tommy P. Chin

[57] ABSTRACT

An apparatus for superimposing an image represented in a predetermined dot arrangement on a video signal. The apparatus includes an inputting device, a memory, a storage block selecting device and a signal switching circuit. The memory has an arrangement of a plurality of storage blocks, each of which includes an arrangement of a plurality of unit storage cells each for storing one bit. The inputting device inputs externally prepared binary signals. The storage block selecting device selects a predetermined storage block for every inputted bit information. All the unit storage cells in the selected storage block store the inputted bit information. The signal switching device sequentially reads the contents stored in each unit storage cell in synchronization with a video signal, switches the video signal and a predetermined superimposing video signal to each other in accordance with the contents and outputs the same. As a result, each dot represented by a plurality of dots in the reproduced video signal after being superimposed. The signal represented by the inputted binary information is reproduced on a picture frame as an expanded image.

9 Claims, 5 Drawing Sheets

APPARATUS FOR SUPERIMPOSING CHARACTER PATTERNS IN ACCORDANCE WITH DOT-MATRIX ON VIDEO SIGNALS

BACKGROUND OF THE PRESENT INVENTION

1. Field of the Present Invention

The present invention relates generally to apparatus for superimposing a signal on another signal, and more particularly, to an apparatus used in video equipments to overlay external information on a video signal.

2. Description of the Related Art

Apparatus for interposing information such as titles on a picture have been used in built-in-camera VTR (Video Tape Recorder) and the like. FIG. 1 is a block diagram showing a typical example of a conventional apparatus of this kind. Referring to FIG. 1, the conventional apparatus includes an A/D (Analog/Digital) converter 12 which from a terminal 10 receives a luminance signal (hereinafter referred to as Y signal) such as a video signal produced by a video camera or reproduced by a VTR to digitize the same based on a certain signal level and converts the same into digital serial data; a shift register 16 connected to the A/D converter 12 and a terminal 14 for converting the serial data and parallel data, for example, of 8 bits into each other in synchronization with a clock signal supplied from the terminal 14; a timing generator 22 connected to the terminals 14, 18 and 20 for generating an address signal showing a position on an image of a portion being processed of the video signal, and in accordance with the processing mode, generating a signal indicating operation timing for elements included in the superimposing apparatus in response to a horizontal synchronizing signal $H_D$ and a vertical synchronizing signal $V_D$ of the video signal inputted from the terminals 18 and 20; a memory 24 connected to the shift register 16 and the timing generator 22 for storing the parallel data converted by the shift register 16 in the address selected by the address signal from the timing generator 22 and for outputting the stored contents of the address selected by the address signal from the timing generator 22 to the shift register 16; a color synthesis circuit 26 connected to the shift register 16 for outputting a component signal for different colors of RGB (Red-Green-Blue) for displaying the title in multi-color in response to a signal which is read out from the memory 24 and converted into the serial data by the shift register 16, in accordance with the colors specified by a controller (not shown) or the like; and a display circuit 32 for mixing each of the component signals of RGB and a video signal inputted from a terminal 28 to be superimposed and outputting the mixed signals to an output terminal 30.

Each of the signals produced by the timing generator 22 includes a writing control signal $\overline{WE}$ for controlling a timing of writing the data to the memory 24 and a reading control signal $\overline{OE}$ for controlling a timing of reading the data from the memory 24.

The display circuit 32 includes a matrix circuit for synthesizing, for example, a Y signal and color difference signals of the title from the component signal; a circuit for producing a luminance blanking signal and a chroma blanking signal showing a timing of switching between the Y and the color signals of the title and those of the picture to be superimposed respectively; and a switching circuit responsive to the blanking signal for switching between the signal of the title and the signal of the picture at a high speed.

Referring to FIG. 1, an operation of a conventional superimposing apparatus will be described. The apparatus has two operation modes. The first is a title-image storing mode for reading a title image and storing the same into the memory 24. The second mode is a superimposing mode for overlaying the title stored in the memory 24 on a video signal inputted from the terminal 28. The modes are switched to each other by an operator by means of an operation panel (not shown).

In the title-image storing mode, a Y signal of a video signal showing a title taken by a camera is inputted from the terminal 10. Inputting the title is carried out by, for example, hand-writing the title on a white paper and converting the title into video signals by a video-camera or the like. The A/D converter 12 compares a level of the Y signal with a given level of a reference signal to convert the Y signal into the digital data by outputting a value of "0" when the level of the Y signal is higher than that of the reference signal and otherwise outputting a value of "1".

The digital data is inputted to the shift register 16. The shift register 16 shifts and stores 8 bits of the serial data at a time and outputs the same as the parallel data of 8 bits to the memory 24. $H_D$ and $V_D$, inputted to the timing generator 22, synchronize with the Y signal inputted from the terminal 10. The synchronization is carried out by extracting only a sync signal from the video signal outputted from a video camera taking a title and amplifying the same.

The timing generator 22 outputs a signal showing a vertical and horizontal positions of the Y signal being processed on the picture frame in response to the clock, $H_D$ and $V_D$. The signal indicates an address in which the data is stored in the memory 24.

When storing all the data of the title image inputted from the terminal 10 in the memory 24 is finished, a hand-written title image is stored in the memory 24 as the image represented by two different values each representing a background portion and a title portion, respectively.

Now, the apparatus operates as follows when the title image stored in the memory 24 is superimposed on a video signal inputted from the terminal 28.

A video signal taken by, for example, a video camera, or reproduced by a VTR is inputted from the terminal 28.

The horizontal synchronizing signal $H_D$ and the vertical synchronizing signal $V_D$ of the video signal inputted from the terminal 28 are inputted to the terminals 18 and 20 respectively. The timing generator 22 outputs an address signal representing a position of a pixel on the picture frame and a $\overline{OE}$ signal indicating the timing of the reading from the memory 24 in response to the clock, $H_D$ and $V_D$. The contents of the address specified by the address signal are outputted to the shift register 16.

The shift register 16 converts the parallel data of 8 bits read out from the memory 24 into the 8-bit serial data by serially shifting and outputting the same.

The color synthesis circuit 26 outputs a component signal of RGB for displaying a title in a color specified by the operator in response to the serial data from the shift register 16.

The display circuit 32 mixes the above-described component signals and the video signal from the terminal 28 and outputs the mixed signals to the output terminal 30. On this occasion, the display circuit 32 switches the blanking signals at a high speed in response to those signals such that an image of the title is outputted for the part where the title characters exist and video signals are outputted for the rest of the part.

A signal outputted from the output terminal 30 is recorded on, for example, a video tape. The recorded signal is reproduced by a home television or the like.

For displaying the title stored in the memory 24, various functions are provided such as improving fineness of the display, reversing the title character and the background, displaying the title in a desired color, so-called "wipe" for displaying and/or erasing the title from a predetermined position or in a plurality of directions, "scrolling" for parallel-transferring the entire title picture on the frame and the like. In some cases, memories capable of storing the data of a plurality of frames for the title characters are provided. In some cases, the titles can be changed from one to another.

As described above, a conventional superimposing apparatus is very convenient which provides an easy and real video shooting and/or a video editing. However, there still exist such problems to be solved as the following.

Conventionally, a title picture is formed by handwriting characters on paper, a white board or the like and converting the same into video signals. The title is represented by two different values with reference to luminance levels of character or pattern portions and a background. If contrast of an object is not sufficient or the background portion is spotted, the title picture may not be reproduced satisfactorily. In many cases it results in reduced sharpness of an image of a character profile. In accordance with a conventional method, hand-written characters can be inputted with relative ease. However, printing characters cannot be easily made a title. Even though some titles are used repeatedly, it is necessary to make a new one each time. Namely, the conventional apparatus has a problem in its operability and quality of a superimposed picture.

SUMMARY OF THE PRESENT INVENTION

Therefore, one object of the present invention is to provide a superimposing apparatus which can produce a superimposed video signal having a good picture quality.

Another aspect of the present invention is to provide a superimposing apparatus by which a superimposed video signal having a good picture quality can be obtained and which is operable with simple procedures.

Still another aspect of the present invention is to improve clearness of characters superimposed on a video signal during reproduction.

An additional aspect of the present invention is to provide an apparatus which, externally supplied with digital signals representing character patterns, is capable of superimposing the character patterns such that the enlarged characters will be reproduced on the screen.

Still further aspect of the present invention is to provide a superimposing apparatus which improves color reproduction of the superimposed characters.

A still further aspect of the present invention is to provide a superimposing apparatus capable of sufficiently enlarging characters to be superimposed at least in a horizontal scanning direction and displaying the enlarged characters such that the characters are displayed with an improved color reproduction.

Additional aspect of the present invention is to provide a superimposing apparatus capable of preventing undesired pictures from being superimposed on a video signal.

The above-described aspects can be accomplished by a superimposing circuit including an input device for inputting signals of two different values having a first predetermined plurality of bit information put in a predetermined order and a memory having at least an arrangement of the first plurality of storage blocks. Each storage block includes an arrangement of a second plurality of unit storage cells each for storing a bit. The superimposing apparatus further includes a storage block selecting device responsive to the inputted bit information for selecting one of the storage blocks in a predetermined order to store the inputted bit information in all the unit storage cells in the selected storage block, and a signal switching circuit for reading the bit information stored in the unit storage cells in the predetermined order in synchronization with video signals, thereby selectively switching between video signals and predetermined video signals to be mixed in response to the read bit information and outputting the selected signal.

According to a preferred embodiment of the present invention, each storage block includes a second plurality of unit storage cells arranged so as to logically form a predetermined matrix.

According to a more preferred embodiment, each matrix is divided into a third plurality of rows arranged in a first predetermined direction, each row includes a fourth plurality of unit storage cells arranged in a second direction intersecting the first direction.

A binary signal externally prepared for representing a predetermined image is inputted through the input device. The information of each bit included in the binary signal is stored in all the unit storage cells in one storage block of a memory selected by the storage block selecting device. The signal switching circuit sequentially reads the contents stored in the unit storage cells in synchronization with the video signal. The signal switching circuit switches between the video signals and the video signals to be mixed, in accordance with the read information. Therefore, one dot of the prepared image is superimposed on the video signal as a plurality of dots represented by the unit storage cells included in the storage block. On a reproduced picture, the original image is displayed, being enlarged corresponding to the number of unit storage cells included in one storage block. Therefore, a plain image is obtained in the superimposed image when reproduced. In addition, the character image to be superimposed is prepared in an external and suitable apparatus. Accordingly, it is easy to prepare the image to be superimposed. Moreover, characters superimposed on the obtained reproduced image are of good shape and the picture is not deteriorated due to unnecessary dots or the like in the superimposed image.

Namely, the apparatus can be provided which is operated with simple procedures and is capable of superimposing an image on a video signal with a good picture quality.

According to another aspect of the present invention, an apparatus for superimposing a predetermined image on a video signal includes an input device for inputting a first binary signal including a first amount of information, an information amount increasing circuit for outputting a second binary signal having a second amount of information larger than the first amount of the information from the first binary signal, a memory for storing the information included in the second binary signal and being capable of storing at least the second amount of the information, and a signal switching circuit for sequentially reading the information stored in the memory in synchronization with the video signal, thereby switching between the video signal and a predetermined video signal to be mixed, in response to the read information to output either of them.

According to a preferred embodiment, the information amount increasing circuit includes an information duplicating circuit for duplicating the information of the first binary signal.

According to a more preferred embodiment, the information duplicating circuit includes a circuit for repeating information duplication which receives one of the information and successively outputs a plurality of information having the same value as that of the received information.

According to the more preferred embodiment, the first binary signal includes a unit signal having a third predetermined amount of information corresponding to one horizontal scanning period of the video signal and the information duplicating circuit further includes a unit signal duplicating circuit for receiving each unit signal and outputting a plurality of duplications of the units signal.

The superimposing apparatus according to the present invention includes the above-described elements. The first binary signal including the first amount of information is converted into the second binary signal by the information increasing circuit. The second binary signal has the second amount of information larger than the first amount of information. The second binary signal is stored in the memory. The signal switching circuit sequentially reads the contents stored in the memory in synchronization with the video signal and in response to a value thereof, switches between the video signal and the video signals to be mixed to output either of them.

One unit of the information corresponds to one dot on the reproduced picture. The increase of the information leads to an increase in area of image to be superimposed on the picture frame, which allows a picture to be more plain. With the information duplicating circuit being provided, the superimposed image is enlarged in a horizontal scanning line direction on the reproduced picture. In addition, with the signal unit duplicating circuit being provided, the superimposed image is enlarged in a vertical direction on the reproduced picture. Accordingly, the superimposed image can be obtained by the first binary character pattern enlarged, which allows the image to be more plain.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention will become more fully understood from the detailed description given below and the accompanying drawings which are given by way of illustration only, and thus are not limitative of the present invention, and wherein.

DESCRIPTION OF THE PREFERRED EMBODIMENTS

Figure 1:
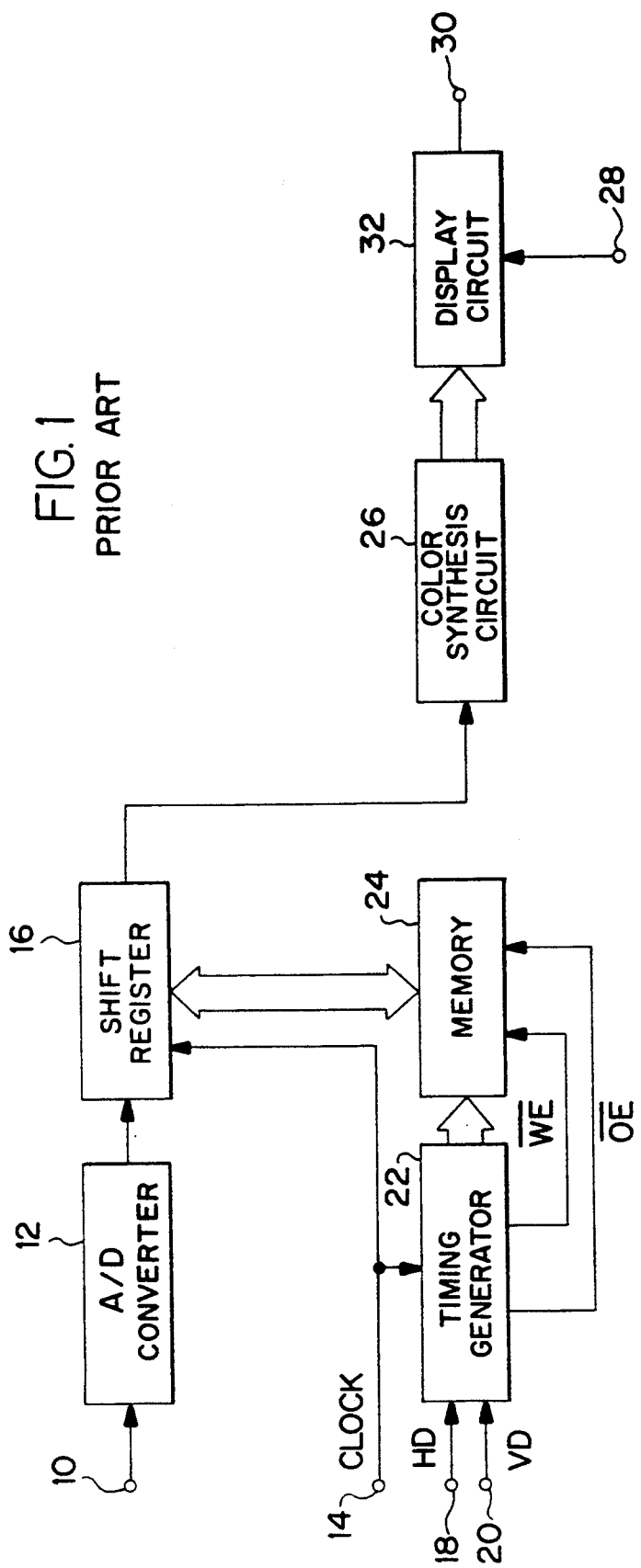
FIG. 1 is a block diagram of a conventional superimposing apparatus.
Figure 2:
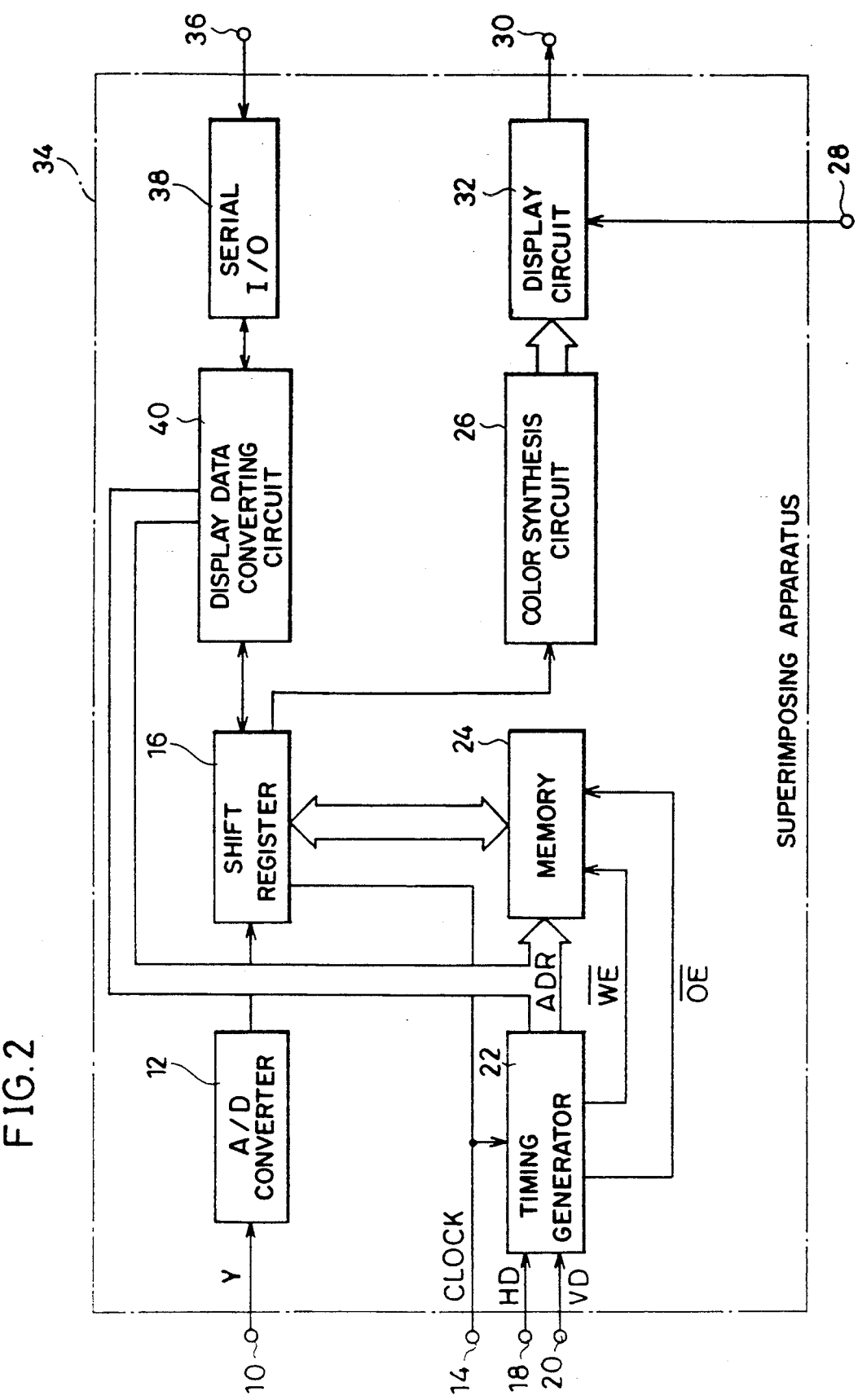
FIG. 2 is a block diagram of a superimposing apparatus according to one embodiment of the present invention.

FIG. 2 is a block diagram showing a schematic structure of a superimposing apparatus 34 according to one embodiment of the present invention. Referring to FIG. 2, the apparatus differs from a conventional apparatus in that it includes a serial I/O (input/output device) 38 for receiving externally prepared text font data representing a title character from an additional terminal 36 and a display data converting circuit 40 connected to the serial I/O 38, the shift register 16 and the memory 24 for restructuring the character represented by the text font data inputted from the serial I/O 38 to input to the shift register 16 the font data. The font data is converted in such a manner that the character is represented by a matrix containing doubled rows and doubled columns each. The circuit 40 is also for calculating an address in which each dot contained in the converted text font data is stored and for inputting the same to the memory 24.

As an apparatus for supplying the text font data of a external title to the terminal 36, most suitable are so-called electronic organizers, portable word processors and the like which are compact, portable and capable of producing data including kanji characters easily. In inputting the text font data in the superimposing apparatus, a dedicated cable may be employed. Other methods such as using a card with incorporated memories can be employed.

The display data converting circuit 40 includes a MPU (Micro Processor Unit) for twice enlarging the text font data by processing each address of the memory 24 and a ROM (Read Only Memory) in which programs to be executed in the MPU are written. The storage address for the inputted text font data can be easily calculated by searching an address calculating table which is previously written in the ROM.

Referring to FIG. 2, an operation of the superimposing apparatus will be described. There are three modes for superimposing operation of the apparatus. The first mode is a first title-image storing mode for storing the title image inputted by a camera or the like in the memory 24 as in the conventional one. A second mode is newly provided in the apparatus of the present invention. The second mode is a second title-image storing mode in which the apparatus receives from the terminal 36 the digital text font data representing title characters prepared by other apparatus and stores the same in the memory 24. The third mode is a conventional superimposing mode in which the title image stored in the memory 24 and the video signal inputted from the terminal 28 are overlaid to be outputted from the output terminal 30 as the conventional one.

The operations of the apparatus in the first title-image storing mode and the superimposing mode are the same as those of the conventional apparatus in the title-image storing mode and the superimposing mode, respectively. Accordingly, description thereof will not be repeated here and a description will be given only on the second image-title storing mode in the following.

The second title-image storing mode is implemented by selection of the second title-image storing mode by an operator using an operational panel (not shown). In this mode, there exists no input signal from the terminal 10. In addition, the address of the memory 24 is designated not by the timing generator 22 but by the display data converting circuit 40.

To the terminal 36, the text font data as serial data is inputted from the external apparatus storing the title characters. The data represents title characters using a plurality of dots. The data represent a character as a set of dots by designating each dot as "on" or "off". The data is prepared as a digital signal in advance.

The text font data is inputted to the display data converting circuit 40 through the serial I/O 38. The display data converting circuit 40 calculates the addresses in the memory 24 for storing each bit of the text font data and outputs the address signals. Meanwhile, the text font data is inputted to the shift register 16 and converted to the parallel data of, for example, 8 bits. The converted text font data is stored in the memory 24 in accordance with the addresses designated by the display data converting circuit 40. On this occasion, the display data converting circuit 40 serves to restructure the original title characters from the inputted text font data and convert the configuration of the restructured characters.

In general, a compact electronic organizer or the like is capable of displaying a limited number of characters at a time. Because there is no need in particular in such devices to express characters with high fineness, the number of dots forming each character is not so large. As an example, an apparatus representing one character with 16×16 dots on a liquid crystal display of 64 dots high and 96 dots wide is commercially available. In this electronic organizer, each line forming a character has a width equivalent to one dot.

On the other hand, the superimposed picture is supposed to be reproduced in a home television set. In case of the home television set, the number of dots which can be displayed on a picture frame is considered to be, for example, 192×192 dots or 256×256 dots.

Accordingly, when the title data inputted from the terminal 36 is stored as it is in the memory 24 and superimposed on the video signal, the balance of the reproduced title character with respect to the reproduced picture is significantly deteriorated. The deterioration is caused, for example, because each character of the title is far smaller than the picture frame, each character is so close to each other that an area occupied by the title is very small with respect to a television picture frame.

Figure 3:
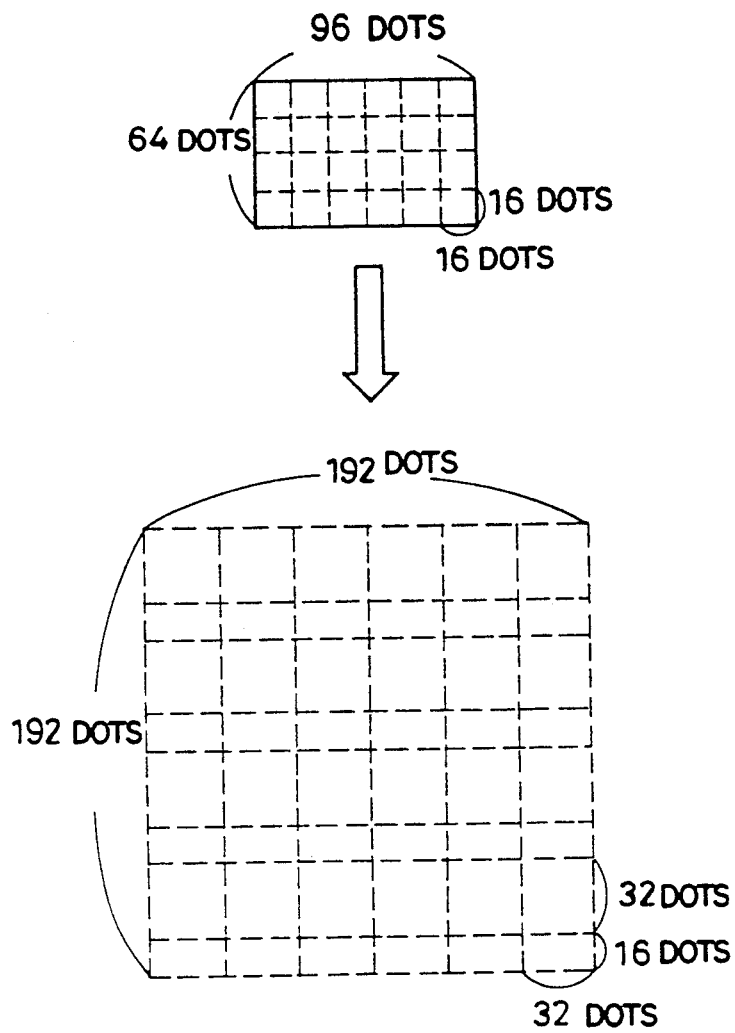
FIG. 3 is a schematic diagram showing double-size expansion of a title character.

Therefore, in storing the text font data in the memory 24, the character data converting circuit 40 processes the text font data as follows. FIG. 3 is a schematic diagram of a title block showing a principle of the processing. Referring to FIG. 3, the title block in which characters of 16×16 dots are arranged in 4 rows and 6 columns is expanded into a block of 192×192 dots by the display data converting circuit 40. On this occasion, each character is converted from a display by 16 ×16 dots into a display by 32×32 dots. At the same time, a blank row having a width of 16 dots is formed between the respective rows. The title characters are processed in this way and stored in the memory 24.

The above-described processing for the text font data is carried out by the display data converting circuit 40. A block of 64×96 dots can be converted into a block of 192×192 dots by making one dot of the inputted text font data to correspond with adjacent 4 dots in the memory 24. This correspondence can be determined as a unique one. A desired converting operation can be implemented by making the correspondence into a table to store the same in the ROM or the like and searching the table in accordance with a program.

As the foregoing, the text font data inputted from the terminal 36 is converted into a preferred form for a title by the display data converting circuit 40 and stored in the memory 24. The text font data has been previously prepared as the digital data by the external device. Therefore, the title character portion and the background are clearly distinguished from each other in the title stored in the memory 24. In addition, an electronic organizer and the like are capable of preparing a plurality of titles to be stored therein, and therefore, a title can be converted into video signals far more easily than by a conventional apparatus for which a title is created by hand-writing each time.

Figure 4:
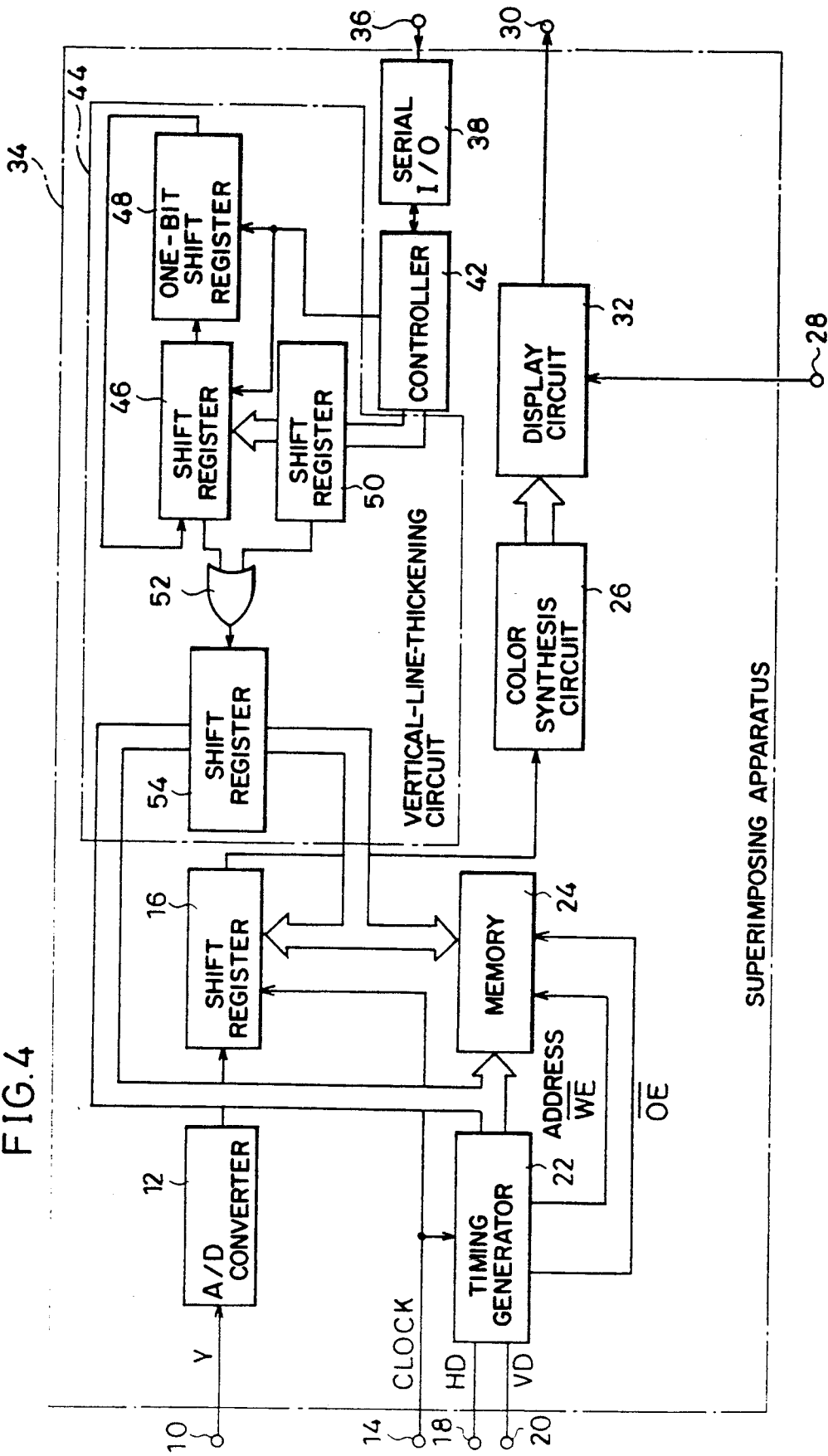
FIG. 4 is a block diagram of a superimposing apparatus according to another embodiment of the present invention.

FIG. 4 is a block diagram showing a schematic structure of another embodiment of a superimposing apparatus according to the present invention. Referring to FIG. 4, the superimposing apparatus differs from the superimposing apparatus shown in FIG. 2 in that it includes a controller 42 connected to the serial I/O 38 and a vertical-line-thickening circuit 44 for increasing width of vertical lines connected to the controller 42 and the memory 24 instead of the display data converting circuit 40. The controller 42 serves as the display data converting circuit 40 in FIG. 2 to restructure the text font data to be inputted and twice enlarge the same. The circuit 44 is for thickening the vertical lines of the title characters stored in the memory 24.

The pictures superimposed by the apparatus is supposed to be recorded on a VTR. It is a common practice that the picture is reproduced by a home television set and displayed thereon not by a personal computer and the like. The home television set displays color pictures by means of so-called composite video signals. A bandwidth of a color signal for representing colors in the composite video signal is no more than the order of 500 KHz. Therefore, color resolution of the home television set in a horizontal direction is low.

Each line of the character twice enlarged by the superimposing apparatus shown in FIG. 2 has a thickness of about two dots. With such a small thickness, the colors, particularly of the vertical lines are thin or are difficult to be taken on due to the low color resolution of the home television set in the horizontal direction.

The circuit 44 is provided for thickening the vertical lines in order to improve reproduced picture quality. Referring to FIG. 4, the circuit 44 includes a shift register 50 connected to the controller 42, a shift register 46 connected to the controller 42 and the shift register 50, a one-bit register 48 connected to the controller 42 and the shift register 46, an OR circuit 52 having two inputs connected to the outputs of the shift register 46 and the shift register 50 respectively, and a shift register 54 connected to the OR circuit 52 and the memory 24 for converting serial data into parallel data and for inputting the converted parallel data into the memory 24.

A basic operation of the superimposing apparatus shown in FIG. 4 is the same as that of the apparatus according to the first embodiment shown in FIG. 2.

This apparatus operates in three operation modes of a first title-image storing mode, a second title-image storing mode and a superimposing mode. The operations of the apparatus in the first title-image storing mode and the superimposing mode are the same as those of the conventional apparatus and the apparatus according to the first embodiment, and therefore description thereof will not be repeated here. Only the second title-image storing mode will be described in the following.

Figure 5A:
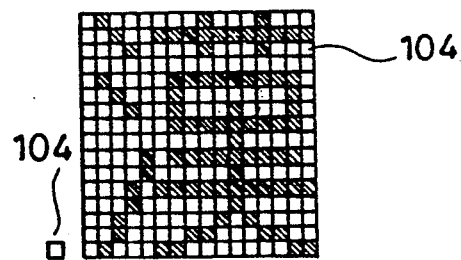
FIGS. 5A to 5C are schematic diagrams showing a double-size expansion of the title character and increase of a vertical line width of the title character.
Figure 5B:
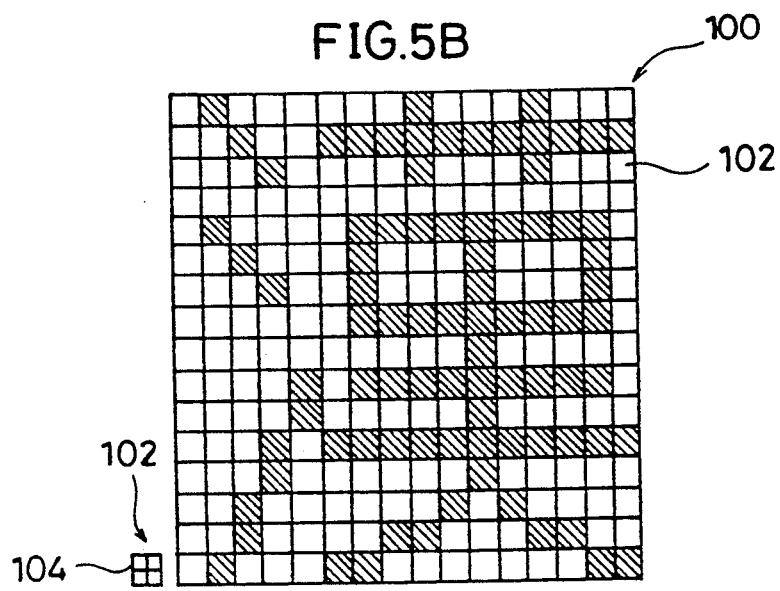

In the second title-image storing mode, text font data of a title prepared by an electronic organizer, a word processor or the like is transferred to the superimposing apparatus through the terminal 36. The text font data is inputted to the controller 42 through the serial I/O 38. The controller 42 restructures an original character image from the inputted text font data and twice enlarge the text font data. FIG. 5A shows the font data before being twice enlarged. FIG. 5B is a schematic diagram of a matrix showing a character represented by the text font data which is twice enlarged by the controller 42. A square on the bottom left-hand corner of FIG. 5A shows a unit storage cell 104 corresponding to one dot of the text font data. Four squares on the bottom left-hand corner of FIG. 5B show 4 dots expanded from one dot in FIG. 5A. The four dots constitute a unit storage block representing one unit dot of the expanded image.

Figure 5C:
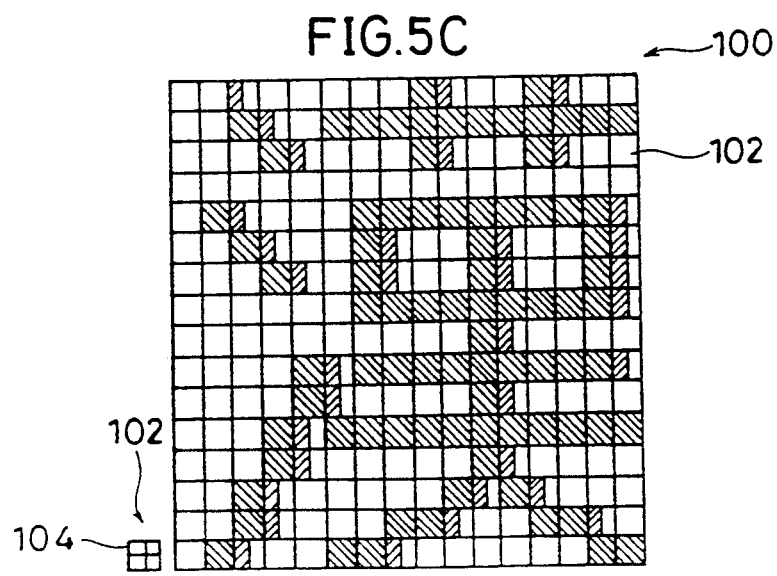

In the text font data outputted front the controller 42, each line which previously had a thickness of one dot has a thickness of 2 dots. A thickness of vertical lines of the text font data is increased by one dot by the circuit 44 and stored in a predetermined address of the memory 24. FIG. 5C shows a title character with vertical lines increased in thickness by one dot. In FIG. 5C, the portions hatched with left-downward lines are those added by the circuit 44.

An operation of each element of the circuit 44 is as follows. One row of the text font data twice enlarged by the controller 42 is parallel-loaded into the shift register 46 and the shift register 50. The shift register 46 shifts all the stored bits by one bit to the right in response to the shift clock from the controller 42. On this occasion, the rightmost one bit of the shift register 46 is stored in the one-bit register 48. The one bit stored in the register 48 goes to the most significant (leftmost) bit of the shift register 46 and set when all the bits are shifted rightward in a processing of the next characters.

The above-described rightward shifting is carried out only for the shift register 46. After the processing of the rightward shifting, the shift registers 46 and 50 sequentially shift the stored contents leftward in response to the shift clock from the controller 42. As a result of the leftward shifting, the serial data representing the text font data is outputted from the shift registers 46 and 50. Signals outputted from the shift register 46 are equivalent to those obtained by delaying the signals outputted from the shift register 50 by one bit.

The OR gate 52 takes a logical OR of a signal from the shift register 46 and a signal from the shift register 50 and inputs the result to the shift register 54. The shift register 54 accesses the memory 24 and writes the data of a predetermined number (in this embodiment, eight) of bits as the parallel data into the memory 24. Accordingly, the data stored in the memory 24 takes a configuration twice enlarged from the original character and having vertical lines increased in thickness by one dot. That is, the shift register 46 serves to draw a boundary between two types of signals. The OR circuit 52 equalizes the bits on the right side of the boundary to the bits on the left side, thereby serving to move the boundary rightward by one bit.

As described above, increasing the thickness of vertical lines compensates for the low color resolution of a home television set in a horizontal direction compared with the first embodiment. If an image which is superimposed with this apparatus is reproduced and recorded by a VTR, the superimposed title is clear, well balanced, and further more takes on adequate colors.

The present invention is not limited to the above-described embodiments. For example, in the above-descrived embodiments, text font data prepared by an external apparatus such as an electronic organizer or a word processor and generated by a character generator provided therein is inputted to the superimposing apparatus. However, the present invention is not limited to such a system. For example, the superimposing apparatus may self-contain a character generator and may receive externally supplied character codes, thereby generating text front data corresponding to the character codes by the character generator. Furthermore, another apparatus may be provided which includes a key-board and a character generator to prepare a title by using a monitor in a built-in-camera VTR or the like with the superimposing apparatus. In addition, it goes without saying that the same effect can be obtained with an apparatus which includes other memory for temporarily storing text font data, converts the stored contents into various formats in accordance with the specification of an operator and writes the converted data into a superimposing memory. Similarly, conversion of the characters is not limited to a double-size expansion, but other conversion may be performed in the range of the numbers of characters permitted. The amount of rightward shifting of each bit of the shift register 46 is not limited to one bit. As long as a character to be displayed is correctly distinguished, it may be shifted by a plurality of bits.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A superimposing apparatus for superimposing a predetermined image signal on a video signal to form a superimposing video signal, comprising:

inputting means for inputting a binary signal including a first predetermined plurality of bit information having a predetermined order;

storing means for storing said binary signal and having an arrangement of at least a first plurality of storage blocks;

each of said first plurality of storage blocks including an arrangement of a second plurality of unit storage cells, each of the second plurality of unit storage cells for storing one bit of said first predetermined plurality of bit information;

storage block selecting means, responsive to said inputted bit information, for selecting one of said first plurality of storage blocks based on said predetermined order to store each one bit of said inputted bit information in all of said unit storage cells included in the arrangement of said one selected storage block; and signal switching means for sequentially reading said bit information stored in said unit storage cells in synchronization with said video signal, in a predetermined order, to selectively switch between said video signal and the predetermined superimposing video signal and output the selectively switched video singal and predetermined superimposing video signal in response to said bit information read by said signal switching means.

2. The superimposing apparatus as claimed in claim 1, wherein each of said storage blocks comprises said second plurality of unit storage cells arranged so as to logically form a predetermined matrix.

3. The superimposing apparatus as claimed in claim 2, wherein said matrix is divided into a third plurality of rows arranged in a first predetermined direction, each of said third plurality of rows comprising a fourth plurality of unit storage cells arranged in a second direction intersecting said first direction.

4. The superimposing apparatus as claimed in claim 3, wherein a product of said third plurality and said fourth plurality is equivalent to said second plurality.

5. The superimposing apparatus as claimed in claim 4, wherein said third plurality is equivalent to said fourth plurality.

6. The superimposing apparatus as claimed in claim 4, wherein said third plurality is two.

7. The superimposing apparatus as claimed in claim 4, wherein two of said unit storage cells adjacent to each other along said first direction and having different storage information form a boundary along said second direction and wherein said superimposing apparatus further comprising:
   boundary detecting means for detecting said boundary for every row; and
   boundary shifting means for shifting said detected boundary toward said first direction.

8. The superimposing apparatus as claimed in claim 7, wherein said boundary detecting means detects said boundary only when said bit information stored in said unit storage cells adjacent to said boundary which is upstream with respect to said first direction is a first predetermined value.

9. The superimposing apparatus as claimed in claim 8, wherein said signal switching means outputs said predetermined superimposing video signal when said bit information read by said signal switching means has said first predetermined value and outputs said video signal when said bit information read by said signal switching means has a second value different from said first predetermined value.

* * * * *